United States Patent
Park et al.

(10) Patent No.: US 8,429,478 B2
(45) Date of Patent: *Apr. 23, 2013

(54) METHOD OF SUPPORTING DATA RETRANSMISSION IN A MOBILE COMMUNICATION SYSTEM

(75) Inventors: Sung Jun Park, Gumi-si (KR); Young Dae Lee, Anyang-si (KR); Sung Duck Chun, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,417

(22) Filed: Jun. 22, 2012

(65) Prior Publication Data

US 2012/0263153 A1    Oct. 18, 2012

Related U.S. Application Data

(63) Continuation of application No. 12/303,246, filed as application No. PCT/KR2007/002785 on Jun. 8, 2007, now Pat. No. 8,234,534.

(60) Provisional application No. 60/863,545, filed on Oct. 30, 2006, provisional application No. 60/815,722, filed on Jun. 21, 2006.

(30) Foreign Application Priority Data

Jan. 10, 2007 (KR) .......................... 10-2007-0003092

(51) Int. Cl.
*G06F 11/00* (2006.01)
(52) U.S. Cl.
USPC ........................................................ 714/749

(58) Field of Classification Search ............... 714/749
See application file for complete search history.

(56) References Cited

U.S. PATENT DOCUMENTS 5,659,756 A    8/1997    Hefferon et al.
5,828,677 A    10/1998    Sayeed et al.
(Continued)

FOREIGN PATENT DOCUMENTS

CN    1315121    9/2001
CN    1411668    4/2003
(Continued)

OTHER PUBLICATIONS

Huawei: "Further Considerations on Multiplexing Method of Shared Control Channel in Uplink Single-Carrier FDMA", 3GPP TSG-RAN WG1, R1-051430 [online], Nov. 7, 2005 [retrieved on Jul. 24, 2008]. Retrieved from the Internet: <http://www.3gpp.org/ftp/TSG_RAN/WG1_RL1/TSGR1_43/Docs/R1-051430.zip> pp. 1-6.

(Continued)

*Primary Examiner* — Bryce Bonzo
(74) *Attorney, Agent, or Firm* — Lee, Hong, Degerman, Kang & Waimey

(57) ABSTRACT

A method of supporting packet transmission in a mobile communication system is disclosed according to the present invention. A method of transmitting packets at a user equipment in a mobile communication system comprises transmitting a first packet to a network and transmitting a second packet to the network regardless of a reception status signal for the first packet, when control information for the second packet is received from the network.

10 Claims, 8 Drawing Sheets

U.S. PATENT DOCUMENTS

| | | |
|---|---|---|
| 6,088,342 A | 7/2000 | Cheng et al. |
| 6,138,158 A | 10/2000 | Boyle et al. |
| 6,317,430 B1 | 11/2001 | Knisely et al. |
| 6,330,448 B1 | 12/2001 | Otsuka et al. |
| 6,381,229 B1 | 4/2002 | Narvinger et al. |
| 6,480,525 B1 | 11/2002 | Parsa et al. |
| 6,571,102 B1 | 5/2003 | Hogberg et al. |
| 6,597,668 B1 | 7/2003 | Schafer et al. |
| 6,597,675 B1 | 7/2003 | Esmailzadeh et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,785,510 B2 | 8/2004 | Larsen |
| 6,791,963 B1 | 9/2004 | Hwang et al. |
| 6,795,412 B1 | 9/2004 | Lee |
| 6,850,504 B1 | 2/2005 | Cao et al. |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,907,015 B1 | 6/2005 | Moulsley et al. |
| 6,934,550 B2 | 8/2005 | Kearney et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,016,343 B1 | 3/2006 | Mermel et al. |
| 7,031,708 B2 | 4/2006 | Sarkkinen et al. |
| 7,075,971 B2 | 7/2006 | Parsa et al. |
| 7,099,309 B2 | 8/2006 | Davidson |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 | 2/2007 | Mir |
| 7,239,870 B2 * | 7/2007 | Zhang et al. ............... 455/422.1 |
| 7,359,345 B2 | 4/2008 | Chang et al. |
| 7,359,349 B2 | 4/2008 | Kayama et al. |
| 7,376,424 B2 | 5/2008 | Kim et al. |
| 7,385,952 B2 | 6/2008 | Mantha et al. |
| 7,398,108 B2 | 7/2008 | Hondo |
| 7,426,175 B2 | 9/2008 | Zhuang et al. |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,590,089 B2 | 9/2009 | Park et al. |
| 7,664,059 B2 | 2/2010 | Jiang |
| 7,729,719 B2 | 6/2010 | Bergstrom et al. |
| 7,826,859 B2 | 11/2010 | Lee et al. |
| 7,848,308 B2 | 12/2010 | Lee et al. |
| 7,881,724 B2 | 2/2011 | Park et al. |
| 8,031,668 B2 * | 10/2011 | Wang et al. ............... 370/329 |
| 8,036,110 B2 * | 10/2011 | Ishii et al. ............... 370/229 |
| 8,068,511 B2 | 11/2011 | Reznik et al. |
| 8,090,382 B2 | 1/2012 | Park et al. |
| 8,234,534 B2 | 7/2012 | Park et al. |
| 2001/0024956 A1 | 9/2001 | You et al. |
| 2001/0046864 A1 | 11/2001 | Bhatoolaul et al. |
| 2002/0009129 A1 | 1/2002 | Choi et al. |
| 2002/0021698 A1 | 2/2002 | Lee et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang et al. |
| 2002/0071480 A1 | 6/2002 | Marjelund et al. |
| 2002/0090004 A1 | 7/2002 | Rinchiuso |
| 2002/0093940 A1 | 7/2002 | Toskala et al. |
| 2002/0116515 A1 | 8/2002 | Hashimoto |
| 2002/0126629 A1 | 9/2002 | Jiang et al. |
| 2002/0131375 A1 | 9/2002 | Vogel et al. |
| 2002/0160744 A1 | 10/2002 | Choi et al. |
| 2002/0181436 A1 | 12/2002 | Mueckenheim et al. |
| 2002/0187789 A1 | 12/2002 | Diachina et al. |
| 2002/0191559 A1 | 12/2002 | Chen et al. |
| 2003/0003920 A1 | 1/2003 | Sebastian |
| 2003/0007510 A1 | 1/2003 | Yeo et al. |
| 2003/0016672 A1 | 1/2003 | Rosen et al. |
| 2003/0035440 A1 | 2/2003 | Casaccia et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0084185 A1 | 5/2003 | Pinkerton |
| 2003/0087655 A1 | 5/2003 | Matsuoka |
| 2003/0103476 A1 | 6/2003 | Choi et al. |
| 2003/0131124 A1 | 7/2003 | Yi et al. |
| 2003/0137931 A1 | 7/2003 | Hans et al. |
| 2003/0139170 A1 | 7/2003 | Heo |
| 2003/0147371 A1 | 8/2003 | Choi et al. |
| 2003/0156624 A1 | 8/2003 | Koslar |
| 2003/0210669 A1 | 11/2003 | Vayanos et al. |
| 2003/0223393 A1 | 12/2003 | Lee |
| 2003/0236085 A1 | 12/2003 | Ho |
| 2004/0001452 A1 | 1/2004 | Day et al. |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann et al. |
| 2004/0057387 A1 | 3/2004 | Yi et al. |
| 2004/0077357 A1 | 4/2004 | Nakada |
| 2004/0097192 A1 | 5/2004 | Schiff |
| 2004/0103435 A1 | 5/2004 | Yi et al. |
| 2004/0109433 A1 | 6/2004 | Khan |
| 2004/0114593 A1 | 6/2004 | Dick et al. |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0146019 A1 | 7/2004 | Kim et al. |
| 2004/0147266 A1 | 7/2004 | Hwang et al. |
| 2004/0147271 A1 | 7/2004 | Billon et al. |
| 2004/0157602 A1 | 8/2004 | Khawand |
| 2004/0171395 A1 | 9/2004 | Shin |
| 2004/0180675 A1 | 9/2004 | Choi et al. |
| 2004/0184437 A1 | 9/2004 | Lee et al. |
| 2004/0185860 A1 | 9/2004 | Marjelund et al. |
| 2004/0196861 A1 | 10/2004 | Rinchiuso et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0223507 A1 | 11/2004 | Kuchibhotla et al. |
| 2004/0229626 A1 | 11/2004 | Yi et al. |
| 2004/0248600 A1 | 12/2004 | Kim |
| 2004/0264497 A1 | 12/2004 | Wang et al. |
| 2004/0264550 A1 | 12/2004 | Dabak |
| 2004/0266494 A1 | 12/2004 | Ruuska et al. |
| 2005/0008035 A1 | 1/2005 | Eklund et al. |
| 2005/0014508 A1 | 1/2005 | Moulsley et al. |
| 2005/0020260 A1 | 1/2005 | Jeong et al. |
| 2005/0025039 A1 | 2/2005 | Hwang et al. |
| 2005/0026623 A1 | 2/2005 | Fisher |
| 2005/0039101 A1 | 2/2005 | Torsner |
| 2005/0041573 A1 | 2/2005 | Eom et al. |
| 2005/0054368 A1 | 3/2005 | Amerga |
| 2005/0059407 A1 | 3/2005 | Reed et al. |
| 2005/0059421 A1 | 3/2005 | Reed et al. |
| 2005/0063336 A1 | 3/2005 | Kim et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0111393 A1 | 5/2005 | Jeong et al. |
| 2005/0118947 A1 | 6/2005 | Ames et al. |
| 2005/0129058 A1 | 6/2005 | Casaccia et al. |
| 2005/0135416 A1 | 6/2005 | Ketchum et al. |
| 2005/0157696 A1 | 7/2005 | Yamamoto |
| 2005/0169232 A1 | 8/2005 | Sakoda et al. |
| 2005/0185608 A1 | 8/2005 | Lee et al. |
| 2005/0190728 A1 | 9/2005 | Han et al. |
| 2005/0195732 A1 * | 9/2005 | Huh et al. ............... 370/206 |
| 2005/0197134 A1 | 9/2005 | McKenna et al. |
| 2005/0207374 A1 | 9/2005 | Petrovic et al. |
| 2005/0213605 A1 | 9/2005 | Kim et al. |

| | | | | | |
|---|---|---|---|---|---|
| 2005/0243767 A1 | 11/2005 | Zhang et al. | EP | 1441473 | 7/2004 |
| 2005/0249141 A1 | 11/2005 | Lee et al. | EP | 1478203 | 11/2004 |
| 2005/0249222 A1 | 11/2005 | van Kampen et al. | EP | 1557968 | 7/2005 |
| 2005/0260997 A1 | 11/2005 | Korale et al. | EP | 1599063 | 11/2005 |
| 2005/0265301 A1 | 12/2005 | Heo et al. | EP | 1496639 | 12/2005 |
| 2005/0271025 A1 | 12/2005 | Guethaus et al. | EP | 1605724 | 12/2005 |
| 2005/0281212 A1 | 12/2005 | Jeong et al. | EP | 1684538 | 7/2006 |
| 2005/0288026 A1 | 12/2005 | Byun et al. | JP | 6-013959 | 1/1994 |
| 2006/0002367 A1 | 1/2006 | Lee et al. | JP | 06-121001 | 4/1994 |
| 2006/0007886 A1 | 1/2006 | Lee et al. | JP | 9-055693 | 2/1997 |
| 2006/0011953 A1 | 1/2006 | Nakahashi et al. | JP | 1997-186704 | 7/1997 |
| 2006/0018289 A1 | 1/2006 | Schulist et al. | JP | 9-327072 | 12/1997 |
| 2006/0025079 A1 | 2/2006 | Sutskover et al. | JP | 11-308671 | 11/1999 |
| 2006/0030342 A1 | 2/2006 | Hwang et al. | JP | 2000-032088 | 1/2000 |
| 2006/0045047 A1 | 3/2006 | Choi et al. | JP | 2000-151494 | 5/2000 |
| 2006/0056347 A1 | 3/2006 | Kwak et al. | JP | 2000-175271 | 6/2000 |
| 2006/0059186 A1 | 3/2006 | Backlund | JP | 2000-184428 | 6/2000 |
| 2006/0062196 A1 | 3/2006 | Cai et al. | JP | 2001-95031 | 4/2001 |
| 2006/0072494 A1 | 4/2006 | Matusz | JP | 2001-298770 | 10/2001 |
| 2006/0083183 A1 | 4/2006 | Teague et al. | JP | 2002064589 | 2/2002 |
| 2006/0088009 A1 | 4/2006 | Gibbs et al. | JP | 2002-374321 | 12/2002 |
| 2006/0120403 A1 | 6/2006 | Murata et al. | JP | 2003-008635 | 1/2003 |
| 2006/0143300 A1 | 6/2006 | See et al. | JP | 2003078480 | 3/2003 |
| 2006/0146745 A1 | 7/2006 | Cai et al. | JP | 2003-116172 | 4/2003 |
| 2006/0153232 A1 | 7/2006 | Shvodian | JP | 2003174470 | 6/2003 |
| 2006/0154680 A1 | 7/2006 | Kroth et al. | JP | 2003333661 | 11/2003 |
| 2006/0168343 A1 | 7/2006 | Ma et al. | JP | 2004-128967 | 4/2004 |
| 2006/0193282 A1 | 8/2006 | Ikawa et al. | JP | 2004-320165 | 11/2004 |
| 2006/0256818 A1 | 11/2006 | Shvodian et al. | JP | 2004312771 | 11/2004 |
| 2006/0292982 A1 | 12/2006 | Ye et al. | JP | 2004-349884 | 12/2004 |
| 2007/0081483 A1* | 4/2007 | Jang et al. ............ 370/315 | JP | 2005-517369 | 6/2005 |
| 2007/0081513 A1 | 4/2007 | Torsner | JP | 2005217743 | 8/2005 |
| 2007/0098006 A1 | 5/2007 | Parry et al. | JP | 2005-236988 | 9/2005 |
| 2007/0099619 A1 | 5/2007 | Parekh et al. | JP | 2005-237013 | 9/2005 |
| 2007/0104151 A1* | 5/2007 | Papasakellariou et al. ... 370/335 | JP | 2005-244958 | 9/2005 |
| 2007/0117579 A1 | 5/2007 | Cai et al. | JP | 2005278167 | 10/2005 |
| 2007/0133458 A1 | 6/2007 | Chandra et al. | JP | 2005-536168 | 11/2005 |
| 2007/0135080 A1 | 6/2007 | Islam et al. | JP | 2005-539462 | 12/2005 |
| 2007/0140115 A1 | 6/2007 | Bienas et al. | JP | 2006-14372 | 1/2006 |
| 2007/0147326 A1 | 6/2007 | Chen | JP | 2006-020044 | 1/2006 |
| 2007/0206531 A1 | 9/2007 | Pajukoski et al. | JP | 2006025437 | 1/2006 |
| 2007/0218930 A1 | 9/2007 | Kuo | JP | 2006-505998 | 2/2006 |
| 2007/0254662 A1* | 11/2007 | Khan et al. ............ 455/436 | JP | 2006352705 | 12/2006 |
| 2007/0274253 A1 | 11/2007 | Zhang et al. | JP | 2009-284532 | 12/2009 |
| 2008/0031253 A1 | 2/2008 | Kim et al. | KR | 10-2001-0111634 | 12/2001 |
| 2008/0069031 A1 | 3/2008 | Zhang et al. | KR | 10-2001-0111637 | 12/2001 |
| 2008/0095105 A1 | 4/2008 | Sundberg et al. | KR | 10-2004-0048675 | 6/2004 |
| 2008/0130643 A1* | 6/2008 | Jain et al. ............ 370/389 | KR | 10-2004-0064867 | 7/2004 |
| 2008/0137564 A1* | 6/2008 | Herrmann ............ 370/310 | KR | 10-2004-0089937 | 10/2004 |
| 2008/0212541 A1* | 9/2008 | Vayanos et al. ........ 370/335 | KR | 1020050029395 | 3/2005 |
| 2008/0232291 A1 | 9/2008 | Hus et al. | RU | 2168278 | 5/2001 |
| 2008/0267136 A1 | 10/2008 | Baker et al. | RU | 2191479 | 10/2002 |
| 2009/0052388 A1 | 2/2009 | Kim et al. | RU | 2232469 | 7/2004 |
| 2009/0109912 A1 | 4/2009 | DiGirolamo et al. | RU | 2232477 | 7/2004 |
| 2009/0163211 A1 | 6/2009 | Kitazoe et al. | RU | 2237380 | 9/2004 |
| 2009/0175241 A1 | 7/2009 | Ohta et al. | RU | 2263415 | 10/2005 |
| 2009/0201948 A1 | 8/2009 | Patwardhan et al. | RU | 2270526 | 2/2006 |
| 2009/0238141 A1 | 9/2009 | Damnjanovic et al. | RU | 2009106289 | 8/2010 |
| 2009/0319850 A1 | 12/2009 | Baek et al. | TW | 407407 | 10/2000 |
| 2009/0323624 A1 | 12/2009 | Kim | TW | 548916 | 8/2003 |
| 2010/0014430 A1 | 1/2010 | Oka | TW | 552815 | 9/2003 |
| 2010/0034095 A1 | 2/2010 | Ho et al. | TW | 586283 | 5/2004 |
| 2010/0103899 A1 | 4/2010 | Kwak et al. | TW | 589818 | 6/2004 |
| 2010/0105334 A1 | 4/2010 | Terry et al. | TW | 590340 | 6/2004 |
| 2011/0038376 A1 | 2/2011 | Wiemann et al. | TW | 592412 | 6/2004 |
| | | | TW | I228008 | 2/2005 |
| FOREIGN PATENT DOCUMENTS | | | TW | I229268 | 3/2005 |
| CN | 1430359 | 7/2003 | TW | I229514 | 3/2005 |
| CN | 1565140 | 1/2005 | TW | 200522579 | 7/2005 |
| CN | 1649285 | 8/2005 | TW | I237478 | 8/2005 |
| CN | 1663158 | 8/2005 | TW | I239731 | 9/2005 |
| CN | 1692661 | 11/2005 | TW | I239756 | 9/2005 |
| DE | 10337828 | 4/2005 | TW | 200536318 | 11/2005 |
| EP | 0978958 | 2/2000 | TW | I242951 | 11/2005 |
| EP | 1009184 | 6/2000 | TW | 200605549 | 2/2006 |
| EP | 1041850 | 10/2000 | TW | I253824 | 4/2006 |
| EP | 1261222 | 11/2002 | WO | 94/09597 | 4/1994 |
| EP | 1361514 | 11/2003 | WO | 98/47302 | 10/1998 |
| EP | 1392074 | 2/2004 | WO | 98/49857 | 11/1998 |

| | | |
|---|---|---|
| WO | 99/44383 | 9/1999 |
| WO | 9960729 | 11/1999 |
| WO | 9963713 | 12/1999 |
| WO | 01/05068 | 1/2001 |
| WO | 01/05121 | 1/2001 |
| WO | 01/35586 | 5/2001 |
| WO | 02/03720 | 1/2002 |
| WO | 02/39697 | 5/2002 |
| WO | 02/43403 | 5/2002 |
| WO | 0239760 | 5/2002 |
| WO | 0247417 | 6/2002 |
| WO | 02-075442 | 9/2002 |
| WO | 02-102110 | 12/2002 |
| WO | 03007636 | 1/2003 |
| WO | 03017691 | 2/2003 |
| WO | 03043259 | 5/2003 |
| WO | 03/047155 | 6/2003 |
| WO | 03/055142 | 7/2003 |
| WO | 03056723 | 7/2003 |
| WO | 03/087978 | 10/2003 |
| WO | 03/096571 | 11/2003 |
| WO | 2004/030393 | 4/2004 |
| WO | 2004034656 | 4/2004 |
| WO | 2004045234 | 5/2004 |
| WO | 2004/075442 | 9/2004 |
| WO | 2004-089030 | 10/2004 |
| WO | 2004/091130 | 10/2004 |
| WO | 2005/006660 | 1/2005 |
| WO | 2005/018269 | 2/2005 |
| WO | 2005/034418 | 4/2005 |
| WO | 2005/036917 | 4/2005 |
| WO | 2005/050918 | 6/2005 |
| WO | 2005055472 | 6/2005 |
| WO | 2005/071887 | 8/2005 |
| WO | 2005074312 | 8/2005 |
| WO | 2005088886 | 9/2005 |
| WO | 2005-099125 | 10/2005 |
| WO | 2005/109695 | 11/2005 |
| WO | 2005/109837 | 11/2005 |
| WO | 2005/117317 | 12/2005 |
| WO | 2005-125125 | 12/2005 |
| WO | 2005119941 | 12/2005 |
| WO | 2006/012946 | 2/2006 |
| WO | 2007/095966 | 8/2007 |

OTHER PUBLICATIONS

NTT Docomo et al.: :Multiplexing Method of Shared Control Channel in Uplink Single-Carrier FDMA Radio Access, 3GPP TSG-RAN WG1, R1-051143 [online], Oct. 10, 2005 [retrieved on Jul. 24, 2008]. Retrieved from the Internet: <http://www.3gpp.org/ftp/tsg_ran/wg1_rl1/TSGR1_42bis/Docs/R1-051143.zip> pp. 1-8.
Philips: "Evolved Paging Indicators for LTE", 3GPP TSG-RAN WG2, R2-052985 [online], Nov. 7, 2005 [retrieved on Aug. 25, 2008]. Retrieved from the Internet: <http://www.3gpp.org/FTP/tsg_ran/WG2_RL2/TSGR2_49/Documents/R2-052985.zip> pp. 1,2.
Sarka, S. et al. Common-Channel Soft Handoff in cdma2000—The Paging Channel. IEEE Transactions on Microwave Theory and Techniques. Jun. 2000, vol. 48, No. 6, pp. 938 to 950, XP011037998, ISSN 0018-9480, abstract, section IV.
NTT Docomo, et al.: "Paging Channel Structure for E-UTRA Downlink", 3GPP TSG-RAN WG1, R1-060034 [online], Jan. 23, 2006 [retrieved on Aug. 25, 2008]. Retrieved from the Internet: <http://www.3gpp1.org/ftp/tsg_ran/WG1_RL1/TSGR1_AH/LTE_AH_January-06/Docs/R1-060034.zip> pp. 1-5.
Motorola: "Paging Channel for E-UTRA", 3GPP TSG-RAN WG1, R1-061712 [online], Jun. 27, 2006 [retrieved on Aug. 25, 2008]. Retrieved from the Internet: http://www.3gpp1.org/ftp/tsg_ran/WG1_RL1/TSGR1_AH/LTE_AH_June-06/Docs/R1-061712.zip> pp. 1-3.

3rd Generation Partnership Project (3GPP), "Technical Specification Group Radio Access Network; Introduction of the Multimedia Broadcast Multicast Service (MBMS) in the Radio Access Network (RAN); Stage 2 (Release 6)," 3GPP TS 25.346 V6.7.0, Dec. 2005.
China Mobile, "RRC States Analysis in LTE," 3GPP TSG RAN WG2#48, R2-052140, Aug. 29, 2005.
Panasonic, "E-UTRA Transport and Logical Channels," 3GPP TSG RAN WG2#49, R2-052860, Nov. 7, 2005.
Siemens, "States in E-UTRAN," 3GPP TSG-RAN WG RAN2#48, R2-052501, Aug. 29, 2005.
Qualcomm Europe, "Signaling Optimization for E-UTRAN," 3GPP TSG-RAN WG2 Meeting #48-bis, R2-052407, Oct. 10, 2005.
Zdarsky, F.A., et al.,"Handover in Mobile Communication Networks: Who is in Control Anyway?", Proceedings of the 30th Annual EUROMICRO Conference, Aug. 31, 2004, XP10723593.
Motorola et al., "MAC-e/es header and functional split," R2-042360, 3GPP TSG RAN WG2 Meeting#45, Nov. 2004.
Ericsson, "User plane protocol enhancements," R2-052749, TSG-RAN WG2 Meeting #48bis, Oct. 2005.
LG Electronics Inc., "MAC Enhancement," R2-060561, 3GPP TSG-RAN WG2 #51, Feb. 2006.
Qualcomm, "Need for MAC-hs segmentation mechanism," R2-020769, 3GPP TSG-RAN WG2 Meeting #28, Apr. 2002.
3rd Generation Partnership Project (3GPP), "LTE; Evolved Universal Terrestrial Radio Access (E-UTRA) Medium Access Control (MAC) Protocol Specification (Release 8)," 3GPP TS 36.321 v8.4.0, Jan. 2009.
Xu, H., et al.; "Performance Analysis on the Radio Link Control Protocol of UMTS System"; 2002 IEEE 56th Vehicular Technology Conference Proceedings; pp. 2026-2030; Sep. 2002.
Ericsson, "Solution for sending NAS together with RRC connection request," R2-071817, 3GPP TSG-RAN WG2#58, May 2007.
LG Electronics Inc., "Default SRB for initial access," R2-061958, 3GPP TSG-RAN WG2 LTE Ad-hoc, Jun. 2006.
3rd Generation Partnership Project (3GPP), "Universal Mobile Telecommunications System (UMTS); Radio Resource Control (RRC) protocol specification (3GPP TS 25.331 version 6.8.0 Release 6)," ETSI TS 125 331, Dec. 2005.
Derryberry R T et al.: "On CDMA 2000 evolution-Reverse high-speed packet data physical layer enhancements in CDMA 2000 1xEV-DV."; IEEE Communications Magazine, Apr. 1, 2005.
Chung J. et al., "Packet synchronization and identification for incremental redundancy transmission in FH-CDMA systems" Third IEEE International Symposium on Personal, Indoor and Mobile Radio Communications, Boston, MA, USA, Oct. 21, 1992.
LG Electronics Inc.: "Framing in the MAC entity", 3GPP TSG-RAN WG2, R2-061012 [online], Mar. 27, 2006.
LG Electronics Inc.: "HARQ and ARQ Operation", 3GPP TSG-RAN WG2, R2-060106 [online], Jan. 9, 2006.
Haardt, M., et al., "The TD-CDMA Based UTRA TDD Mode," IEEE Journal on Selected Areas in Communications, vol. 18, No. 8, pp. 1375-1385, Aug. 2000.
IPwireless, "Layer 2 functions for LTE", R2-052377, 3GPP TSG RAN WG2 #48bis, Oct. 2005, XP-050129489.
LG Electronics Inc., "MAC Architecture of LTE", R2-060105, 3GPP TSG-RAN WG2 #50, Jan. 2006, XP-050130258.
LG Electronics Inc., "Discussion on RLC PDU Structure", R2-070721, 3GPP TSG-RAN WG2 #57, Feb. 2007, XP-050133754.
LG Electronics Inc., "HARQ and ARQ Operation", R2-060563, 3GPP TSG-RAN WG2 #51, Feb. 2006, XP-050130522.
Ericsson: "E-UTRA Random Access", 3GPP TSG-RAN WG1, R1-051445 [online], Nov. 7, 2005, XP003020958.
European Patent Office Application Serial No. 07747056.5, Search Report dated Feb. 14, 2013, 7 pages.
European Patent Office Application Serial No. 07746856.9, Search Report dated Jan. 31, 2013, 8 pages.

* cited by examiner

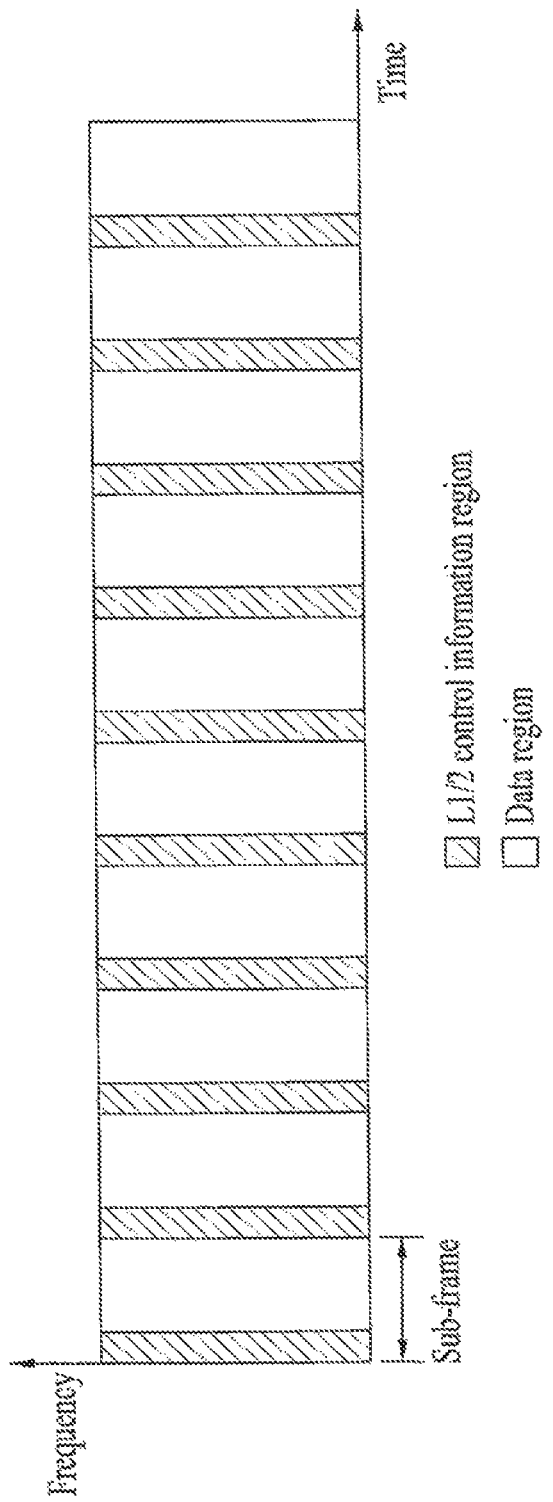

METHOD OF SUPPORTING DATA RETRANSMISSION IN A MOBILE COMMUNICATION SYSTEM

CROSS-REFERENCE TO RELATED APPLICATIONS

This application is a continuation of U.S. patent application Ser. No. 12/303,246, filed on Dec. 2, 2008, now U.S. Pat. No. 8,234,534, which is the National Stage filing under 35 U.S.C. 371 of International Application No. PCT/KR2007/002785, filed on Jun. 8, 2007, which claims the benefit of earlier filing date and right of priority to Korean Application No. 10-2007-0003092, filed on Jan. 10, 2007, and also claims the benefit of U.S. Provisional Application Ser. Nos. 60/863,545, filed on Oct. 30, 2006, and 60/815,722, filed on Jun. 21, 2006, the contents of which are all incorporated by reference herein in their entirety.

TECHNICAL FIELD

The present invention relates to a mobile communication system, more particularly, to a method of supporting data retransmission in a Mobile communication system.

BACKGROUND ART

Recently, an auto repeat request (ARQ) or hybrid auto repeat request (HARQ) scheme is widely used in order to performing effective communications by increasing throughput in a mobile communication system.

The ARQ or HARQ is a scheme whereby a receiving side transmits information on whether received data has a reception error to a transmitting side, so that the transmitting side can retransmit data having the reception error. In other words, in a system supporting the ARQ or HARQ scheme, the receiving side transmits, to the transmitting side, positive reception acknowledgement (ACK) for a packet successfully received from the transmitting side, whereas the receiving side transmits, to the transmitting side, negative reception acknowledgement (NACK) for a data packet unsuccessfully received so that the transmitting side retransmits the data packet for which NACK is received.

FIG. 1 is a diagram illustrating an HARQ scheme in a WCDMA system in accordance with a conventional art. Referring to FIG. 1, a base station determines a user equipment (UE) to which a packet is to be transmitted and a format (a coding rate, a modulation scheme, and data amount, etc) of the packet. The base station transmits control information for the packet to the user equipment on a downlink control channel (HS-SCCH) and then transmits the packet to the user equipment on a downlink data channel (HS-DSCH) at a certain time associated with the transmitting time of the control information.

After receiving the packet from the base station, the user equipment decodes the received packet. If the packet is successfully decoded, the user equipment transmits ACK to the base station through an uplink channel. The base station receiving ACK from the user equipment-realizes that the packet has been successfully transmitted to the user equipment and transmits a next packet. If the user equipment fails to successfully decode the received packet, the user equipment transmits NACK to the base station. The base station receiving NACK from the user equipment configures a retransmission packet which has an identical or new packet format and transmits the retransmission packet to the user equipment. The user equipment tries to decode the retransmission data by combining the retransmission packet with the initial packet in various ways.

In adopting the ARQ or HARQ scheme, it is necessary for a transmitting side to receive ACK or NACK from a receiving side with significant reliability. In case that the transmitting side receives and decodes ACK or NACK erroneously, radio resources can be wasted by transmitting a retransmission packet which is unnecessary since the receiving side receives an initial packet successfully or by transmitting a new packet although retransmission of an initial packet is necessary since the receiving side fails to successfully receive the initial packet. For example, when a user equipment obtains NACK by erroneously receiving or decoding ACK received from a base station, the user equipment retransmits an initial packet to the base station. In this case, the base station considering that the initial packet has been successfully received may allocates, to another user equipment, radio resources which should be allocated to the user equipment. In this case, the first user equipment retransmits the initial packet and the second user equipment transmits a new packet through the identical radio resources. As a result, the base station cannot receive the retransmission packet from the first user equipment nor the new packet from the second user equipment successfully because of a data collision between the retransmission packet and the new packet on the identical radio resources.

SUMMARY OF THE INVENTION

Accordingly, the present invention is directed to a method of supporting data retransmission in a mobile communication system that substantially obviates one or more of the problems due to limitations and disadvantages of the related art.

One object of the present invention is to provide a method of supporting a retransmission scheme in a mobile communication system, whereby transmission reliability of positive reception acknowledgement (ACK) or negative reception acknowledgement (NACK) can be increased.

Another object of the present invention is to provide a method of supporting a retransmission scheme in a mobile communication system, whereby communication efficiency can be increased.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method of supporting a hybrid automatic repeat and request (HARQ) in a mobile communication system, the method comprising receiving a packet from a user equipment, decoding the received packet, transmitting a reception status signal for the packet according to the decoding result, and transmitting supplemental control information indicating that the reception status signal is a positive acknowledgement signal (ACK) when the received packet is successfully decoded.

In one aspect of the present invention, a method of supporting a hybrid automatic repeat and request (HARQ) at a user equipment in a mobile communication system comprises transmitting a first packet to a network, receiving a reception status signal for the first packet from the network, obtaining a negative acknowledgement signal (NACK) by decoding the reception status signal, and receiving supplemental control information indicating that the reception status signal is a positive acknowledgement signal (ACK).

In another aspect of the present invention, a method of supporting a hybrid automatic repeat and request (HARQ) at a user equipment in a mobile communication system comprises transmitting a first packet to a network, receiving a reception status signal for the first packet from the network, receiving an uplink scheduling grant message allocating uplink resources for transmitting a second packet from the network, and performing a next procedure on an assumption that the first packet is successfully received by the network.

In still another aspect of the present invention, a user equipment for supporting a hybrid automatic repeat and request (HARQ) in a mobile communication system is adapted to perform the steps of transmitting a first packet to a network, receiving a reception status signal for the first packet from the network, obtaining a negative acknowledgement signal (NACK) by decoding the reception status signal, and receiving supplemental control information indicating that the reception status signal is a positive acknowledgement signal (ACK).

In further still another aspect of the present invention, a user equipment for supporting a hybrid automatic repeat and request (HARQ) a mobile communication system is adapted to perform the steps of transmitting a first packet to a network, receiving a reception status signal for the first packet from the network, receiving an uplink scheduling grant message allocating uplink resources for transmitting a second packet from the network, and performing a next procedure on an assumption that the first packet is successfully received by the network.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a diagram illustrating a structure of physical channels in the E-UMTS;

BEST MODE FOR CARRYING OUT THE INVENTION

Figure 1:
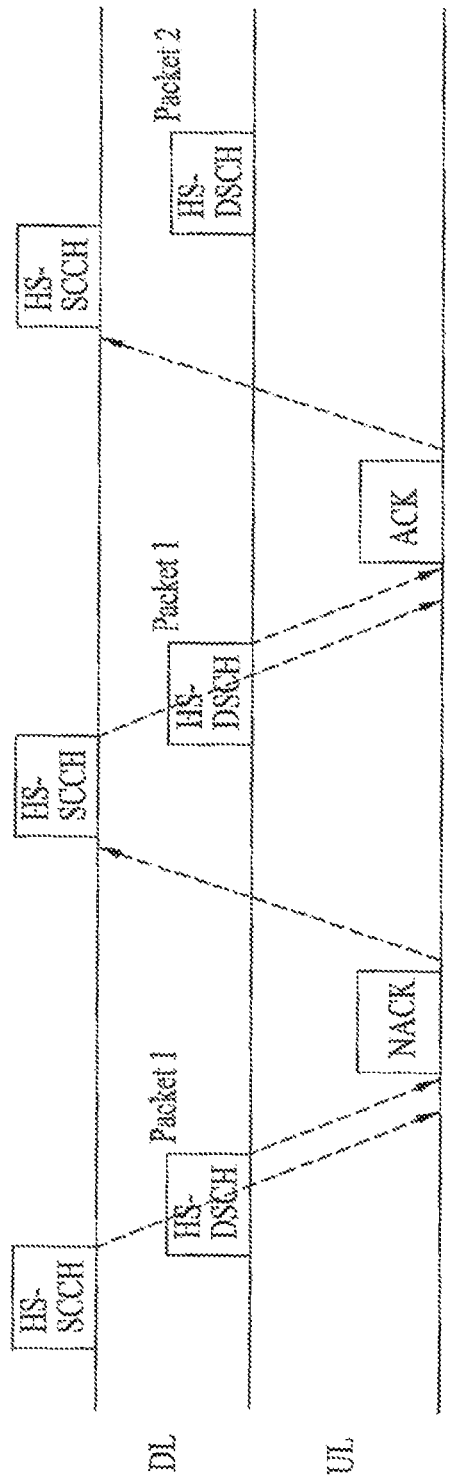
FIG. 1 is a diagram illustrating an HARQ scheme in a WCDMA system in accordance with a conventional art.
Figure 2:
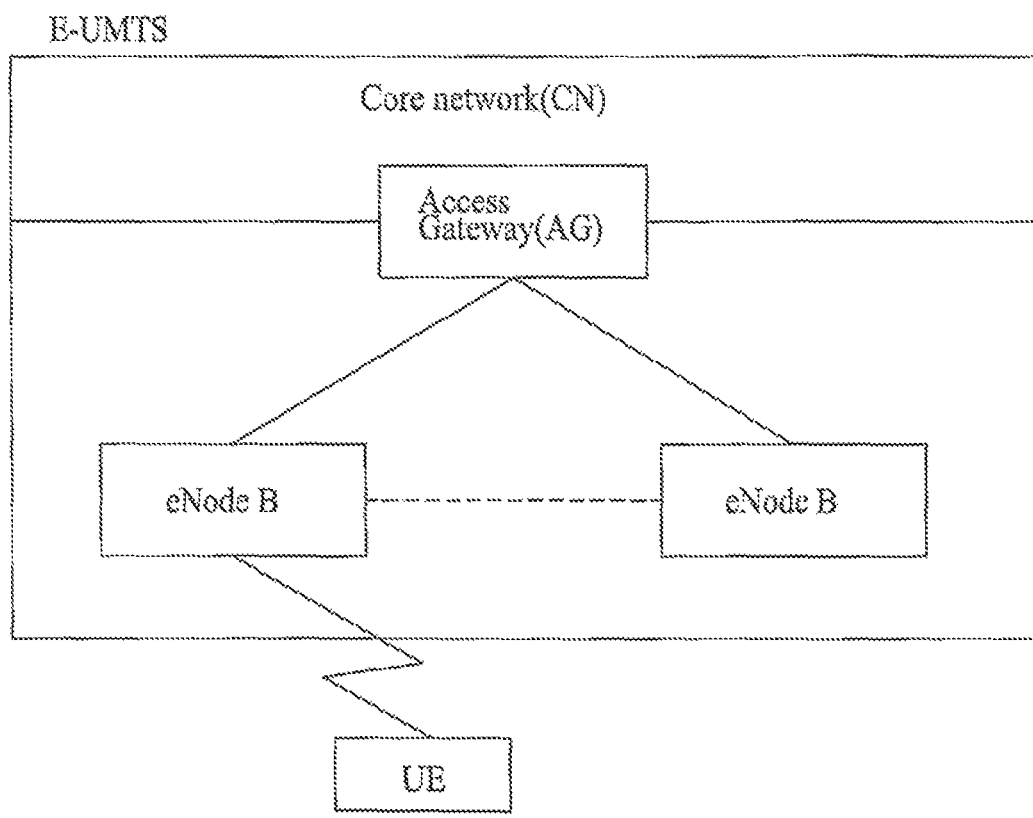
FIG. 2 is a block diagram of a network structure of E-UMTS (evolved universal mobile telecommunications system)

FIG. 2 is a block diagram of a network structure of an E-UMTS (Evolved-Universal Mobile Telecommunications System) to which technical features of the present invention are applied. An E-UMTS is a system evolving from the conventional UMTS and its basic standardization is currently handled by the 3GPP ($3^{rd}$ Generation Partnership Project). The E-UMTS can also be called an LTE (Long Term Evolution) system. Release 7 and Release 8 of 3GPP technical specifications ($3^{rd}$ Generation Partnership Project; Technical Specification Group Radio Access Network) can be referred to obtain detailed information about the UMTS and E-UMTS, Referring to FIG. 2, an E-UMTS network includes a user equipment (hereinafter abbreviated 'UE'), a base station (hereinafter named 'eNode B' or 'eNB') and an access gateway (hereinafter abbreviated 'aGW') connected to an external network by being located at an end of the E-UMTS network. The aGW may be classified into a part for handling user traffic and a part for handling control traffic. A first aGW for processing new user traffic may communicate with a second AG for processing control traffic via a new interface. A eNode-B may include at least one cell. A first interface for transmitting user traffic or a second interface for transmitting control traffic may be located between several eNode-Bs. The CN may include the aGW and a plurality of nodes for registering users of User Equipments (UEs). If required, another interface for discriminating between the E-UTRAN and the ON may also be used for the LTE network. The aGW manages mobility of a UE by unit of a tracking area (TA). A TA comprises a plurality of cells. When a UE moves into a TA from another TA, the UE informs the aGW of the change of the TAs. The eNode B includes at least one cell.

Figure 3:
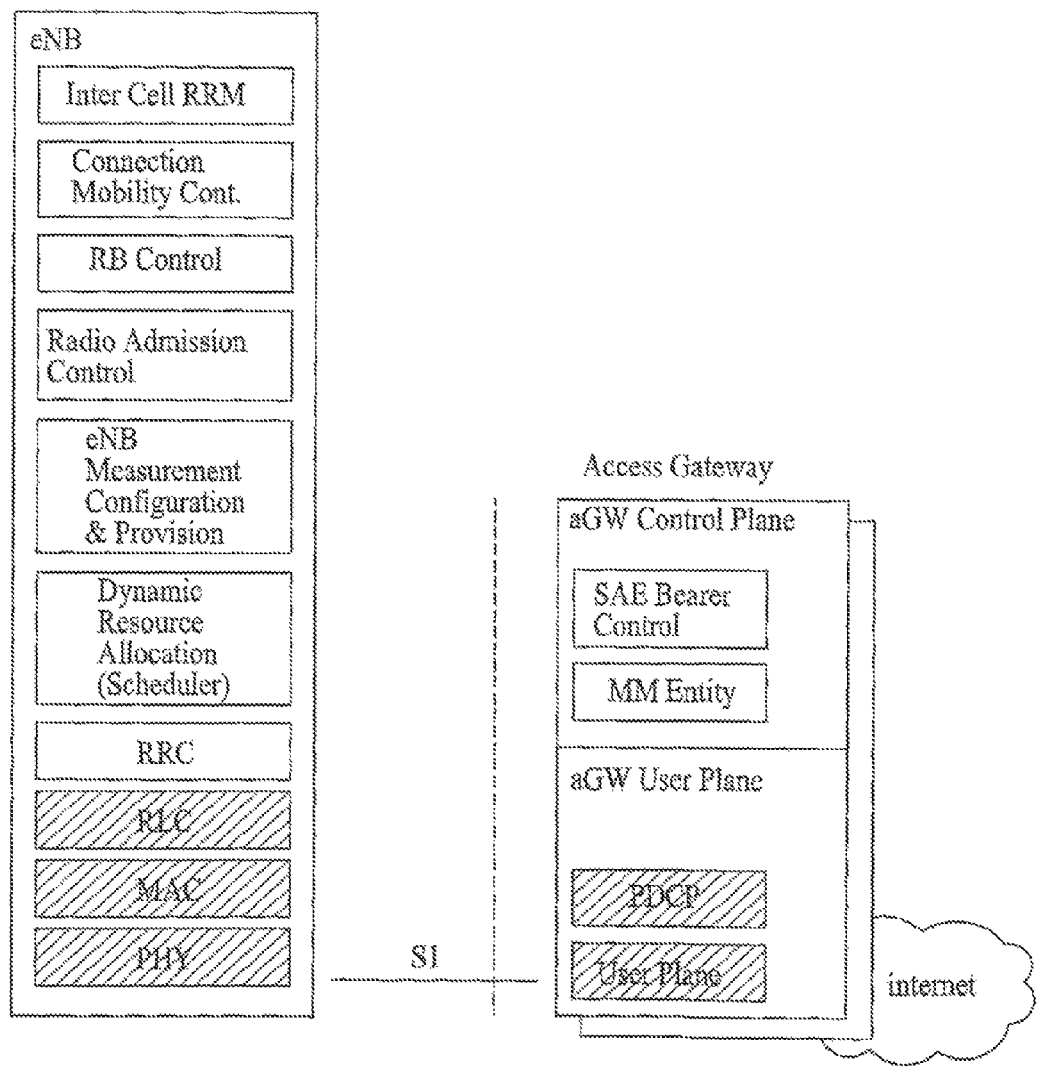
FIG. 3 is a schematic diagram illustrating a protocol architecture of an E-UTRAN.

FIG. 3 is a schematic diagram illustrating protocol architecture of an E-UTRAN. In FIG. 2, the hatching part represents functional entities of a control plane and the non-hatching part represents functional entities of a user plane.

Layers of a radio interface protocol between a UE and a network can be classified into a first layer L1, a second layer L2 and a third layer L3 based on three lower layers of OSI (open system interconnection) reference model widely known in communication systems. A physical layer belonging to the first layer L1 provides an information transfer service using a physical channel. A radio resource control (hereinafter abbreviated 'RRC') located at the third layer plays a role in controlling radio resources between the UE and the network. For this, the RRC layer enables RRC messages to be exchanged between the UE and the network. The RRC layer can be distributively located at network nodes including an eNode B, an AG and the like or at either the Node B or the AG.

Figure 4A:
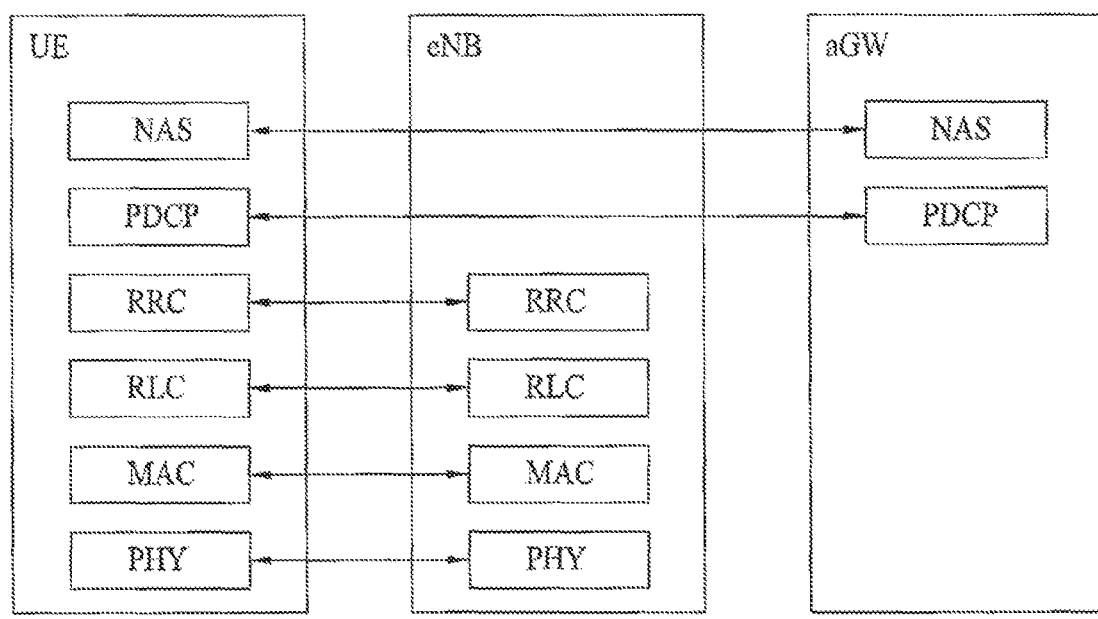
FIG. 4A and 4B are architectural diagrams of a control plane and a user plane, respectively of a radio interface protocol between UE (user equipment) and UTRAN (UMTS terrestrial radio access network) based on the 3GPP radio access network standard.
Figure 4B:
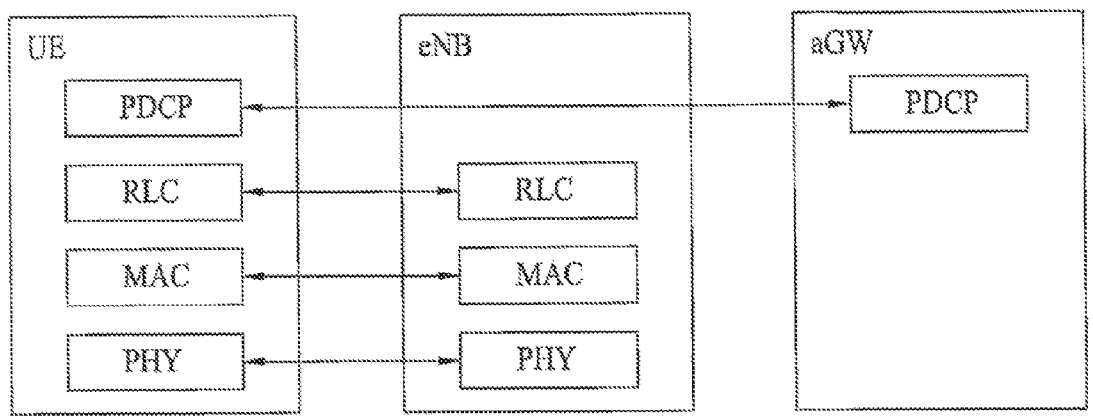

FIGS. 4A and 4B are architectural diagrams of a control plane and a user plane, respectively of a radio interface protocol between UE (user equipment) and UTRAN (UMTS terrestrial radio access network) based on the 3GPP radio access network standard. Referring to FIG. 4A, a radio interface protocol vertically includes a physical layer, a data link layer, and a network layer and horizontally includes a user plane for data information transfer and a control plane for signaling transfer. The protocol layers in FIG. 4A can be classified into L1 (first layer), L2 (second layer), and L3 (third layer) based on three lower layers of the open system interconnection (OSI) standard model widely known in the communications systems.

The respective layers of a radio protocol control plane shown in FIG. 4A and a radio protocol user plane shown in FIG. 4B are explained as follows.

First of all, the physical layer as the first layer provides information transfer service to an upper layer using physical channels. The physical layer (PHY) is connected to a medium access control (hereinafter abbreviated 'MAC') layer above the physical layer via transport channels. Data are transferred between the medium access control layer and the physical layer via the transport channels. Moreover, data is transferred between different physical layers, and more particularly, between one physical layer of a transmitting side and the other physical layer of a receiving side via the physical channels. A downlink physical channel of the E-UMTS is modulated according to an orthogonal frequency division multiplexing (OFDM) scheme and time and frequency are used as radio resources.

The medium access control (hereinafter abbreviated 'MAC') layer of the second layer provides a service to a radio link control (hereinafter abbreviated RLC) layer above the MAC layer via logical channels. The RLC layer of the second layer supports reliable data transfer. In order to effectively transmit IP packets (e.g., IPv4 or IPv6) within a radio-communication period having a narrow bandwidth, a PDCP layer of the second layer (L2) performs header compression to reduce the size of a relatively-large IP packet header containing unnecessary control information.

A radio resource control (hereinafter abbreviated 'RRC') layer located on a lowest part of the third layer is defined in the control plane only and is associated with configuration, reconfiguration and release of radio hearers (hereinafter abbreviated 'RBs') to be in charge of controlling the logical, transport and physical channels. In this case, the RB means a service provided by the second layer for the data transfer between the UE and the UTRAN.

As a downlink transport channel carrying data to UEs from the network, there is a broadcast channel (BCH) carrying system information and a downlink shared channel (SCH) carrying user traffic or control messages. The traffic or control messages of a downlink multicast or broadcast service can be transmitted via the downlink SCH or an additional downlink multicast channel (MCH). Meanwhile, as an uplink transport channel carrying data to the network from UEs, there is a random access channel (RACH) carrying an initial control message and a uplink shared channel (UL-SCH) carrying user traffic or control message.

In the E-UMTS system, an OFDM is used on the downlink and a single carrier frequency division multiple access (SC-FDMA) on the uplink. The OFDM scheme using multiple carriers allocates resources by unit of multiple sub-carriers including a group of carriers and utilizes an orthogonal frequency division multiple access (OFDMA) as an access scheme.

A physical layer of an OFDM or OFDMA scheme divides active carriers into a plurality of groups and transmits each group to a different receiving side. Radio resource allocated to each UE which is defined as a time-frequency region on a two-dimensional sphere comprises continuous sub-carriers on a frequency axis and symbols on a time axis. A time-frequency region in the OFDM or OFDMA scheme is a rectangular form sectioned by time and frequency coordinates. One or more time-frequency region can be allocated to an uplink for a UE and an eNB can transmit one or more time-frequency region to a UE. In order to define a time-frequency region on the two-dimensional sphere, the number of OFDM symbols and sub-carriers starting from a point having an offset from a reference point should be given.

The E-UMTS uses 10 ms radio frame comprising 20 sub-frames. Namely, a sub-frame is 0.5 ms length. A resource block comprises one sub-frame and twelve sub-carriers, each of which is 15 kHz. One sub-frame comprises a plurality of OFDM symbols and a part of the plurality of OFDM symbols can be used for L1/2 control information.

FIG. 5 is a diagram illustrating a structure of physical channels in the E-UMTS. In FIG. 5, a sub-frame comprises a L1/2 control information transmission region (the hatching part) and a data transmission region (the non-hatching part).

One embodiment of an HARQ scheme applicable to the E-UMTS system will be described as follows.

A base station which transmits downlink data to user equipments based on the HARQ scheme transmits downlink (DL) scheduling information on a DL L1/2 control channel to a user equipment (UE).

The DL scheduling information may include an identifier (ID) for a UE or a UE group, information about downlink radio resources allocated for DL data transmission (region, duration, etc), a modulation scheme, a size of payload, transmission parameters like information on multi-input multi-output (MIMO), etc, HARQ process information, a redundancy version and a new data indicator indicating whether data is new or not, etc.

Basically, the DL scheduling information can be transmitted on the DL L1/2 control information during data retransmission. The contents of the DL scheduling information can vary according to channel environments. For example, in case that the channel environment is better than that of an initial transmission, data having higher data rate can be transmitted by changing a modulation scheme or a size of payload. On the other hand, in case that the channel environment is worse than the initial transmission, data of lower data rate can be transmitted.

The user equipment obtains the DL scheduling information by monitoring the DL L1.2 control channel in every transmit time interval (TTI) and then receives data from the base station by using the DL scheduling information.

However, because the amount of information which can be transmitted through the DL L1/2 control channel is limited, it is difficult for the DL scheduling information for plurality of user equipments to be transmitted in a single TTI. In this reason, the DL scheduling information can be transmitted during an initial data transmission only and can be used for data retransmissions thereafter without transmitting further DL scheduling information. A user equipment monitoring the DL L1/2 control information receives a packet in accordance with DL scheduling information, if the DL scheduling information includes an identifier of the user equipment.

In case that the user equipment fails to successfully receive the packet, the user equipment requests data retransmission by transmitting NACK to the base station. The base station transmits a retransmission packet to the user equipment without transmitting DL scheduling information. In other words, the user equipment which has transmitted NACK to the base station can receive the retransmission packet in a predetermined time period based on the DL scheduling information received during the initial transmission. With the above data retransmission scheme, radio resources can be saved since DL scheduling information for retransmission data does not need to be transmitted.

Figure 6:
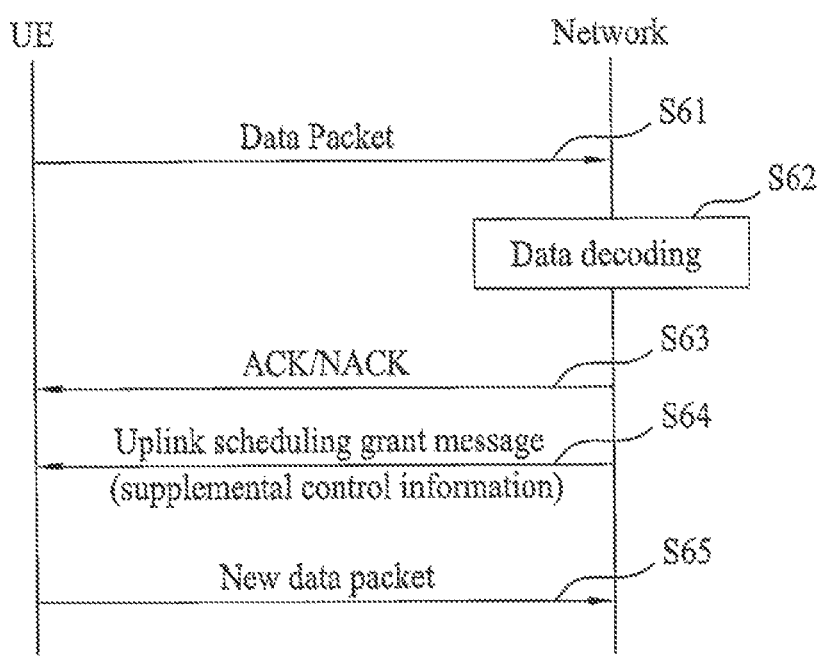
FIG. 6 is a flow diagram illustrating an embodiment of the present invention.

FIG. 6 is a flow diagram illustrating an embodiment of the present invention. The embodiment of FIG. 6 is an example for obviating a situation that a user equipment erroneously retransmits a packet by misunderstanding ACK from a network (UTRAN or E-UTRAN) as NACK owing to deterioration of channel environments, etc.

Referring to FIG. 6, a user equipment transmits a data packet to a network [S61]. Receiving and decoding the packet [S62], the network transmits ACK or NACK to the user equipment according to the decoding result [S63]. Namely, the network transmits ACK to the user equipment in case that the packet is successfully decoded, otherwise NACK is transmitted.

When the network transmits ACK to the user equipment, the network transmits an uplink scheduling grant message through a DL L1/2 control channel [S64]. The uplink scheduling grant message can includes two kinds of information. First, in case that it is necessary for the network to allocate radio resources to the user equipment, the uplink scheduling grant message includes radio resource allocation information. Second, in case that it is unnecessary for the network to allocate radio resources to the user equipment, the uplink scheduling grant message includes supplemental control information. The supplemental control information is information indicating that the network has transmitted ACK for the packet received from the user equipment, whereby obviating a situation that the user equipment misunderstands ACK transmitted by the network as NACK.

The necessity of allocating the radio resources to the user equipment can be determined based on whether the user equipment stores data to be transmitted in its buffer, namely based on status of the buffer of the user equipment. In other words, when the user equipment has data to be transmitted to the network, it is necessary for the network to allocate the radio resources for transmitting the data, otherwise allocation of the radio resources is unnecessary.

The network is able to obtain the buffer status of the user equipment through a buffer status report received from the user equipment periodically or if a specific event occurs. The user equipment can inform the network when the last packet is transmitted through a MAC protocol data unit (PDU). For example, in case that two MAC PDUs are stored in the buffer of the user equipment, the user equipment transmits a first MAC PDU including information indicating that one MAC PDU is stored in the buffer, whereby informing the network that there remains one MAC PDU in the buffer. More specifically, when the $N^{th}$ MAC PDU is the last data stored in the buffer of the user equipment, the user equipment makes control information indicating that the $N^{th}$ MAC PDU is the last data included in the $(N-1)^{th}$ MAC PDU including, when transmitting the $(N-1)^{th}$ MAC PDU. As a specific example, either existing or newly added one bit of MAC PDU can be used as the control information. When the one bit can be used in a way that the one bit of '0' indicates that there are two or more MAC PDUs in the buffer and the one bit of '1' indicates that there is one MAC PDU in the buffer.

The supplemental control information can be included in the uplink scheduling grant message in various formats within a scope of indicating the actual meaning. For example, the following embodiments can be considered.

First, the supplemental control information can be included in a way that at least one field of the uplink scheduling grant message is set to have a predefined value. For example, every bit of the at least one field can be set to have a value of '0'. More specifically, as described above, the uplink scheduling grant message includes a plurality of fields to include a UE identifier, a UE group identifier, location and duration of allocated radio resources, and transmission parameters. As the supplemental control information, all bits of all or a part of the fields other than a field for the UE or UE group identifier can be set to have a value of '0'. Alternatively, one bit or two or more consecutive bits of a field can be set to have a meaning of the supplemental control information. For example, the field for the duration of allocated radio resources can be set to have values of '111'.

Second, a field including the supplemental control information can be added to the uplink scheduling grant message. For example, one bit can be newly added to the uplink scheduling grant message. The uplink scheduling grant message can be used in a way that if the added bit is set to have a value of '0', the uplink scheduling grant message is interpreted to be used for radio resource allocation and if the added bit is set to have a value of '1', the uplink scheduling grant message is interpreted to be used for transferring the supplemental control information.

As another embodiment, the supplemental control information can be included in an independent control message to be transmitted to the user equipment other than the uplink scheduling grant message. The control message including the supplemental message can be transmitted on the L1/2 control channel or a downlink shared channel (DL-SCH). For example, the supplemental control information can be transmitted to the user equipment by using a control message having a size of one or more bits on the DL L1/2 control channel. In this case, radio resources for transmitting the control message can be allocated to each user equipment in advance. Namely, when a radio bearer (RB) is established, the radio resources for the control message can be allocated through a radio resource control (RRC) message.

As a specific example, in case that it is unnecessary for the network to allocate radio resource to the user equipment when the network transmits ACK to the user equipment, a hit of the control message is set to have a value of '1' to be transmitted to the user equipment.

The user equipment may or may not transmit a new data packet in accordance with ACK/NACK and the supplemental control information [S65].

Figure 7:
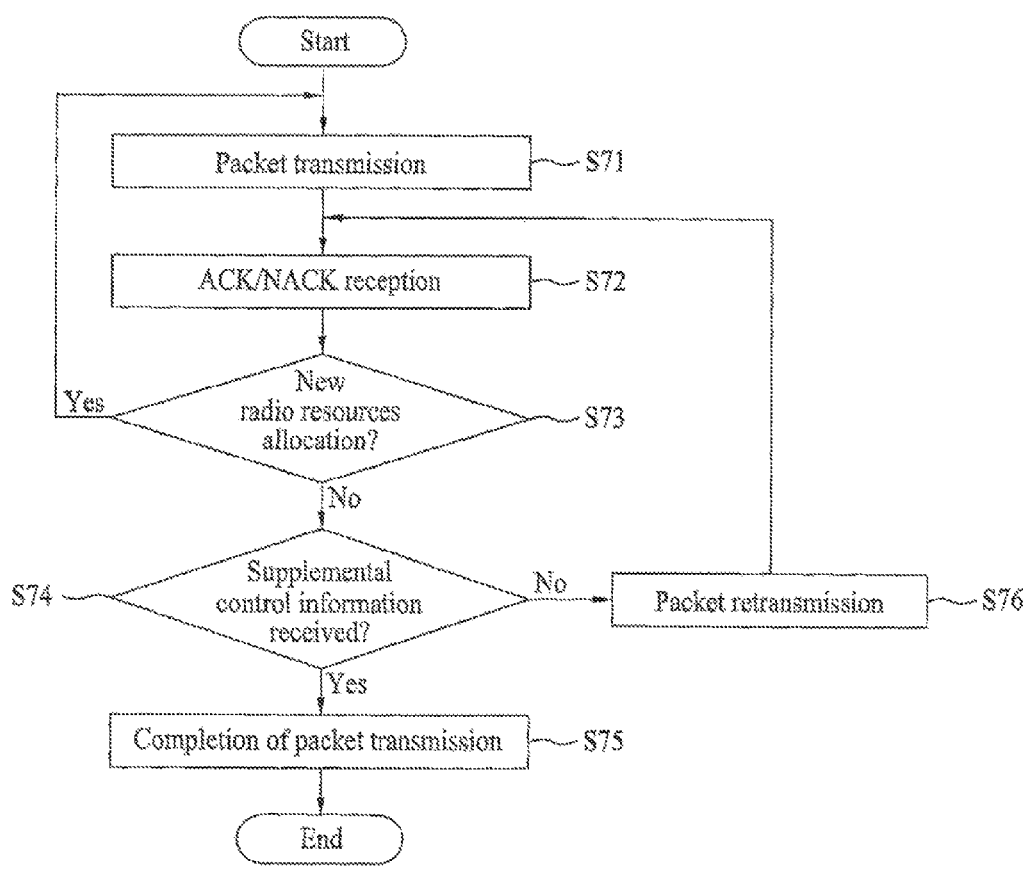
FIG. 7 is a flow diagram illustrating a procedure in a user equipment in accordance with an embodiment of the present invention.

FIG. 7 is a flow diagram illustrating a procedure in a user equipment in accordance with an embodiment of the present invention. The user equipment operates differently depending on whether the user equipment receives ACK or NACK from the network and whether the user equipment receives the supplemental control information or not.

Referring to FIG. 7, the user equipment transmits a data packet to the network [S71]. The user equipment receives ACK or NACK from the network [S72]. When receiving ACK, the user equipment transmits a new packet to the network through radio resources allocated from the network. In case that the user equipment receives ACK and the supplemental control information from the network, the user equipment realizes that the network receives the packet successfully.

When the user equipment receives NACK from the network, the user equipment examines whether new radio resources are allocated to the user equipment [S73]. In case that the new radio resources are allocated to the user equipment, the user equipment determines whether the packet is successfully received by the network in the following ways.

In case that the number of packet transmissions is greater than a predetermined maximum number of retransmission, the user equipment interprets that the network has failed to successfully receive the packet and informs an upper layer of the fact, so that enables the upper layer to retransmit the packet according to protocols of the upper layer. In case that the number of packet transmissions is not greater than the predetermined maximum number of retransmission, the user equipment transmits a new packet through the allocated radio resources. In other words, when the new radio resources are allocated to the user equipment though the user equipment has received NACK from the network, the user equipment realizes that NACK has been erroneously received by the network though the network has transmitted ACK to the user equipment. Accordingly, the user equipment considers that the packet has been received successfully by the network and does not transmit a retransmission packet.

In case that new radio resources are not allocated to the user equipment, the user equipment examines whether the supplemental control information is received from the network [S74]. When the supplemental control information is received, the user equipment regards the received NACK as ACK and considers that the network has successfully received the packet. A lower layer of the user equipment informs an upper layer that the network has successfully received the packet. The upper layer does not consider retransmission of the packet and terminates transmission of the corresponding packet [S75]. In case that the user equipment has received NACK from the network and new radio resources has not been allocated to the user equipment, the user equipment considers that the network has failed to successfully receive the packet and transmits a retransmission packet [S76].

According to the present invention, transmission reliability of ACK or NACK and communication efficiency in a mobile communication system can be increased.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to such a wireless communication system as wireless Internet, mobile communication system and the like.

What is claimed is:

1. A method of transmitting packets at a user equipment in a mobile communication system, comprising:
   transmitting a first packet to a network; and
   transmitting a second packet to the network regardless of a reception status signal for the first packet, when control information for the second packet is received from the network.

2. The method of claim 1, wherein the control information comprises an uplink scheduling grant message allocating uplink resources for transmitting the second packet.

3. The method of claim 1, wherein the second packet is not a retransmission packet.

4. The method of claim 1, further comprising:
   receiving the reception status signal for the first packet from the network; and
   obtaining a negative acknowledgement signal (NACK) by decoding the reception status signal.

5. The method of claim 1, wherein the mobile communication system is based on an orthogonal frequency-division multiplexing (OFDM) scheme or an orthogonal frequency-division multiple access (OFDMA) scheme.

6. A user equipment for transmitting packets in a mobile communication system, the user equipment being adapted to perform the steps of:
   transmitting first packet to a network; and
   transmitting a second packet to the network regardless of a reception status signal for the first packet, when an uplink scheduling grant message allocating uplink resources for the second packet is received from the network.

7. The user equipment of claim 6, wherein the control information comprises an uplink scheduling grant message allocating uplink resources for transmitting the second packet.

8. The user equipment of claim 6, wherein the second packet is not a retransmission packet.

9. The user equipment of claim 6, wherein the user equipment being further adapted to perform the steps of:
   receiving the reception status signal for the first packet from the network; and
   obtaining a negative acknowledgement signal (NACK) by decoding the reception status signal.

10. The user equipment of claim 6, wherein the mobile communication system is based on an orthogonal frequency-division multiplexing (OFDM) scheme or an orthogonal frequency-division multiple access (OFDMA) scheme.

* * * * *